US009238731B2

(12) United States Patent
Cernohous et al.

(10) Patent No.: US 9,238,731 B2
(45) Date of Patent: Jan. 19, 2016

(54) REINFORCING ADDITIVES FOR COMPOSITE MATERIALS

(75) Inventors: Jeffrey Jacob Cernohous, Hudson, WI (US); David Geraint Roberts, Sheboygan Falls, WI (US); Kevin P. Gohr, Sheboygan, WI (US)

(73) Assignee: SACO POLYMERS, INC., Sheboygan, WI (US)

( * ) Notice: Subject to any disclaimer, the term of this patent is extended or adjusted under 35 U.S.C. 154(b) by 446 days.

(21) Appl. No.: 12/918,632

(22) PCT Filed: Feb. 27, 2009

(86) PCT No.: PCT/US2009/035362
§ 371 (c)(1),
(2), (4) Date: Aug. 20, 2010

(87) PCT Pub. No.: WO2009/111272
PCT Pub. Date: Sep. 11, 2009

(65) Prior Publication Data
US 2010/0331458 A1     Dec. 30, 2010

Related U.S. Application Data

(60) Provisional application No. 61/067,601, filed on Feb. 29, 2008.

(51) Int. Cl.
*C08K 9/00* (2006.01)
*C08L 23/08* (2006.01)
*C08K 9/04* (2006.01)
*C08L 23/06* (2006.01)
*C08L 23/10* (2006.01)
*C08J 3/22* (2006.01)
*C08L 51/06* (2006.01)
*C08L 97/02* (2006.01)

(52) U.S. Cl.
CPC ............. *C08L 23/0815* (2013.01); *C08J 3/226* (2013.01); *C08K 9/04* (2013.01); *C08L 23/06* (2013.01); *C08L 23/10* (2013.01); *C08L 51/06* (2013.01); *C08L 97/02* (2013.01); *C08J 2400/26* (2013.01)

(58) Field of Classification Search
CPC ....................................................... C08K 9/04
USPC ................ 524/9–16; 523/205, 209, 212, 351; 428/364, 373, 391, 393
See application file for complete search history.

(56) References Cited

U.S. PATENT DOCUMENTS

| 4,663,388 A | 5/1987 | Douglass et al. |
| 4,717,742 A | 1/1988 | Beshay |
| 4,764,546 A | 8/1988 | Mitsuno et al. |
| 4,800,125 A | 1/1989 | Plueddemann |
| 4,820,749 A | 4/1989 | Beshay |
| 4,868,226 A | 9/1989 | Mitsuno et al. |
| 5,120,776 A * | 6/1992 | Raj et al. ................ 524/13 |
| 5,967,211 A * | 10/1999 | Lucas et al. ............. 152/209.4 |
| 5,981,067 A * | 11/1999 | Seethamraju et al. ...... 428/393 |
| 6,046,279 A | 4/2000 | Roberts et al. |
| 6,210,792 B1 * | 4/2001 | Seethamraju et al. ...... 428/326 |
| 6,265,037 B1 | 7/2001 | Godavarti et al. |
| 6,271,270 B1 | 8/2001 | Muzzy et al. |
| 6,387,967 B2 | 5/2002 | Muzzy et al. |
| 6,682,789 B2 * | 1/2004 | Godavarti et al. ........... 428/34 |
| 6,939,903 B2 | 9/2005 | Sigworth et al. |
| 7,030,188 B2 | 4/2006 | Botros et al. |
| 7,348,371 B2 | 3/2008 | Mehata et al. |
| 7,402,625 B2 | 7/2008 | Cernohous et al. |
| 2003/0032702 A1 | 2/2003 | Medoff et al. |
| 2003/0100634 A1 | 5/2003 | Heath et al. |
| 2004/0214925 A1 | 10/2004 | Sigworth |
| 2005/0058822 A1 | 3/2005 | Ittel |
| 2005/0154095 A1 * | 7/2005 | Heath et al. ................ 524/35 |
| 2006/0194902 A1 | 8/2006 | Nie et al. |
| 2007/0072961 A1 | 3/2007 | Ma et al. |
| 2007/0208110 A1 | 9/2007 | Sigworth et al. |

FOREIGN PATENT DOCUMENTS

| EP | 0864612 A1 | 9/1998 |
| EP | 0864612 A1 | 9/1998 |
| EP | 0905186 B1 | 3/1999 |

OTHER PUBLICATIONS

V.N. Hristov, R. Lach, W. Grellmann, Impact fracture behavior of modified polypropylene/wood fiber composites, Polymer Testing, Aug. 2004, pp. 581-589, vol. 23, Issue 52, Elsevier Ltd.

Velichko Hristov, Sefanka Vasileva, Dynamic Mechanical and Thermal Properties of Modified Poly(propylene) Wood Fiber Composites, Macromolecular Materials and Engineering, 2003, pp. 798-806, vol. 288, Issue 10.

L.M. Arzondo, C.J. Perez, J.M. Carella, Injection Molding of Long Sisal Fiber-Reinforced Polypropylene: Effects of Compatibilizer Concentration and Viscosity on Fiber Adhesion and Thermal Degradation, Polymer Engineering and Science, 2005, pp. 613-621.

Marti-Ferrer et al., "Flour Rice Husk as Filler in Block Copolymer Polypropylene:Effect of Different Coupling Agents", Journal of Applied Polymer Science, May 8, 2005, pp. 1823-1831, vol. 99, 2005 Wiley Periodicals, Inc.

Belgacem et al., "The surface modification of cellulose fibres for use as reinforcing elements in composite materials", Composite Interfaces, vol. 12, No. 1-2, pp. 41-75, VSP 2005.

Yazdani et al., "Effects of Silane Coupling Agent and Maleic Anhydride-Grafted Polypropylene on the Morphology and Viscoelastic Properties of Polypropylene-Mica Composites", Polymer Composites—2006.

Xie et al., "Silane coupling agents used for natural fiber/polymer composites: A review", Composites: Part A, Mar. 2010.

(Continued)

*Primary Examiner* — Peter D Mulcahy
(74) *Attorney, Agent, or Firm* — Foley & Lardner LLP

(57) ABSTRACT

Compositions and methods for producing polymeric composites containing reinforcing additives. In one embodiment, a filler is also included in the formulation. Articles produced from the reinforcing additives and the composites of this invention are useful as building materials and automotive components.

24 Claims, No Drawings

(56) References Cited

OTHER PUBLICATIONS

Rowell, "Property Enhanced Natural Fiber Composite Materials Based on Chemical Modification", Science and Technology of Polymer and Advanced Materials, 1998.

Johh et al., "Recent Developments in Chemical Modification and Characterization of Natural Fiber-Reinforced Composites", Polymer Composites—2008.

* cited by examiner

REINFORCING ADDITIVES FOR COMPOSITE MATERIALS

CROSS REFERENCE TO RELATED APPLICATIONS

This application is a national stage filing under 35 U.S.C. 371 of PCT/US2009/035362, filed Feb. 27, 2009, which claims priority to U.S. Provisional Patent Application No. 61/067,601 filed Feb. 29, 2008, the disclosures of which are herein incorporated by reference in their entirety.

FIELD OF THE INVENTION

The present invention relates to additives for composite materials. Specifically, the present invention provides strategies for producing composites that possess superior mechanical properties by admixing a polymeric matrix and a reinforcing additive. The reinforcing additive of this invention comprises a coupling agent and a cellulosic fiber. The resulting composite has been found to possess superior mechanical properties when compared to composites known in the art.

BACKGROUND OF THE INVENTION

Wood plastic composites (WPCs) have found application in a multitude of commercial products in recent years. In 2007, the overall market for WPCs was estimated to be billions of pounds annually. By and large, the leading uses for WPC are found in construction and automotive markets. When compared to conventional mineral or glass filled composites, WPCs have lower specific gravity, better strength/weight and are often lower cost. They also have the look of natural wood, while being much easier to maintain. However, natural wood is cheaper, has lower specific gravity and better strength/weight when compared to WPCs. Thus, there is a clear need to develop technologies that will improve the mechanical properties of WPCs.

SUMMARY OF THE INVENTION

The reinforcing additives, when utilized in WPC formulations to form composite articles, dramatically improve mechanical properties (i.e., tensile, flexural and impact) of the resulting composite articles. The reinforcing additive comprises of a coupling agent, cellulosic fibers and optionally an elastomeric polymer. In another embodiment, a polymeric matrix is melt processed with cellulosic materials and reinforcing additives. The resulting composites of the present invention demonstrate markedly improved physical properties (e.g., flexural modulus and impact strength) when compared to conventional WPC materials. Composites of this invention have been found to have flexural and impact properties as much as two fold greater than composite materials that do not contain a reinforcing additive. Composites of this invention have utility in many applications. Non-limiting examples include building materials and automotive components. Specific applications of particular utility include extruded sheet products, including those useful as thermoformed automotive components.

In one embodiment, a polymeric matrix is melt processed with a reinforcing additive to form a useful article. The reinforced additive may include a coupling agent that is a functionalized polyolefin and cellulosic fibers from sisal. In another embodiment, the thermoplastic matrix is melt processed with a reinforcing additive and at least one additional filler to produce a composite. The composites are produced using conventional melt processing techniques.

For purposes of the present invention, the following terms used in this application are defined as follows:

"Polymeric Matrix" means a melt processable polymeric material or resin.

"Filler" means an organic or inorganic material that does not possess viscoelastic characteristics under the conditions utilized to melt process the filled polymeric matrix.

"Composite" means a mixture of a polymeric material and a filler.

"Cellulosic Filler" means natural or man-made materials derived from cellulose that have a weight average aspect ratio (L:D) of less than 5:1. Cellulosic materials include for example: wood flour, wood fibers, sawdust, wood shavings, newsprint, paper, flax, hemp, grain hulls, kenaf, jute, sisal, nut shells or combinations thereof.

"Cellulosic Fiber" means natural or man-made materials derived from cellulose that have a weight average aspect ratio (L:D) of at least 5:1. Cellulosic materials include for example: wood flour, wood fibers, sawdust, wood shavings, newsprint, paper, flax, hemp, grain hulls, kenaf, jute, sisal, nut shells or combinations thereof.

"Reinforcing Additive" means a coupling agent that has been melt processed with a cellulosic fiber.

"Melt Processable Composition" means a formulation that is melt processed, typically at elevated temperatures, by means of a conventional polymer processing technique such as extrusion or injection molding as an example.

"Cellulosic Material" means natural or man-made materials derived from cellulose. Non-limiting examples of cellulosic materials include for example: wood flour, wood fibers, sawdust, wood shavings, newsprint, paper, flax, hemp, grain hulls, kenaf, jute, sisal, nut shells or combinations thereof.

"Melt Processing Techniques" means extrusion, injection molding, blow molding, rotomolding batch mixing.

The above summary of the present invention is not intended to describe each disclosed embodiment or every implementation of the preset invention. The detailed description that follows more particularly exemplifies illustrative embodiments.

DETAILED DESCRIPTION OF THE INVENTION

The reinforcing additive for composite materials includes a coupling agent, cellulosic fibers and optionally an elastomeric polymer. The reinforcing additive produced upon the melt processing of the noted components is suitable for application in polymeric matrix to form a composite. More specifically, the present invention provides strategies for producing composites that possess superior mechanical properties by melt processing thermoplastics with reinforcing additives. In one embodiment, the reinforcing additive is comprised of a coupling agent and cellulosic fibers. In another embodiment, a thermoplastic matrix is melt processed with cellulosic materials and reinforcing additives. The resulting composites of the present invention have markedly improved physical properties (e.g., flexural modulus and impact strength) when compared to conventional WPC materials. Composites of this invention have been found to have flexural and impact properties as much as two fold greater than composite materials that do not contain a reinforcing additive. Specifically, composites having a flexural modulus of greater than 3500 MPa, flexural strength of greater than 65 MPa, and impact strength of greater than 186 joules/meter and impact strength of greater than are described. Composites of this invention have utility in many applications. Non-limiting examples include building materials, transportation materials and automotive components. Specific applications of particular utility include extruded sheet products, including those useful as thermoformed, compression molded or compression-blow molded automotive components.

Any cellulosic fiber that has a weight average aspect ratio of at least 5:1 is suitable for producing the reinforcing additive of the present invention. Exemplary embodiments are those that incorporate cellulosic fibers that have superior tensile strength, including hemp, sisal or other cellulosic fibers commonly utilized in cordage. Sisal is one example of a cellulosic fiber that is well suited for the disclosed applications. In a one embodiment, cellulosic fiber of this invention is chosen such that it has an aspect ratio of at least 5:1 (length: diameter). The aspect ratio may be at least 10:1 or alternatively at least 20:1.

The reinforcing additive of this invention is produced by melt processing a cellulosic fiber with a coupling agent and optionally an elastomeric polymer. In general coupling agents suitable for this invention include compositions that improve the compatibility and interfacial adhesion between the thermoplastic matrix and the cellulosic fiber. Non-limiting examples of coupling agents include functionalized polymers, organosilanes, organotitanates and organozirconates. Non-limiting examples of functionalized polymers include amphiphilic block copolymers, reactive block copolymers, reactive graft copolymers and end-functionalized polymers. Functionalized polymers may include functionalized polyolefins, maleated polyolefins, polyethylene-co-vinyl acetate, polyethylene-co-acrylic acid and polyethylene-co-acrylic acid salts.

The elastomeric component is optionally added to the reinforcing additive. In one embodiment, an elastomer may be added to the reinforcing additive formulation to impart improved impact strength and moldability of the resulting composite formulation. For the purpose of this invention, an elastomeric material is characterized as any polymer or copolymer that has at least one glass transition temperature (Tg) less than room temperature. Exemplary embodiments of this invention include reinforcing additive compositions that contain thermoplastic elastomers, natural and synthetic rubbers and polyolefin copolymers. Non-limiting examples of thermoplastic elastomers include poly(styrene-co-isoprene) poly(styrene-co-butadiene), poly(acrylonitrile-co-butadiene-co-styrene) (ABS) copolymers and poly(styrene-block-butadiene-block-styrene) (SBS), poly(styrene-block-isoprene-block-styrene) (SIS), poly(styrene-block-ethylene/butylene-block-styrene) (SEBS) copolymers. Non-limiting examples of natural and synthetic rubber include poly(isoprene), poly(isobutylene), poly(butadiene), poly(acrylates), poly(methacrylates), silicones and poly(cycloolefins). Non-limiting examples of polyolefin copolymers include poly(ethylene-co-octene), poly(ethylene-co-hexene), poly(ethylene-co-vinyl alcohol), poly(ethylene-co-vinyl acetate). The molecular weight and chemical composition of these elastomeric polymeric carriers may be adjusted to provide the desired characteristics.

The composites of the present invention are produced by melt processing polymers with the reinforcing additive. In one embodiment, the reinforcing additive comprises 0.1-25 wt % of the composition, 0.25-15 wt %, or 1-10 wt %. In another embodiment, a filler may be utilized to impart desired mechanical properties to the composite of the present invention. In one embodiment the filler is a cellulosic material, such as for example, wood flour. In a one exemplary embodiment, the filler comprises 5-70 wt % of the composition, 15-65 wt %, or 25-60 wt %.

The polymeric matrix functions as the host polymer and is a primary component of the melt processable composition. A wide variety of polymers conventionally recognized in the art as suitable for melt processing are useful as the polymeric matrix. They include both hydrocarbon and non-hydrocarbon polymers. Examples of useful polymeric matrices include, but are not limited to, polyamides, polyimides, polyurethanes, polyolefins, polystyrenes, polyesters, polycarbonates, polyketones, polyureas, polyvinyl resins, polyacrylates and polymethylacrylates.

The polymeric matrix may include blended polymers. Non-limiting examples of polymers for blending include, high density polyethylene (HDPE), low density polyethylene (LDPE), linear low density polyethylene (LLDPE), polypropylene (PP), polyolefin copolymers (e.g., ethylene-butene, ethylene-octene, ethylene vinyl alcohol), polystyrene, polystyrene copolymers (e.g., high impact polystyrene, acrylonitrile butadiene styrene copolymer), polyacrylates, polymethacrylates, polyesters, polyvinylchloride (PVC), fluoropolymers, polyamides, polyether imides, polyphenylene sulfides, polysulfones, polyacetals, polycarbonates, polyphenylene oxides, polyurethanes, thermoplastic elastomers (e.g., SIS, SEBS, SBS), epoxies, alkyds, melamines, phenolics, ureas, vinyl esters or combinations thereof. An exemplary blend suitable for polymeric matrices is polyolefins and thermoplastic elastomers.

In another aspect of the invention, the composite of this invention can be melt processed with additional fillers. Typically, when a polymer matrix is melt processed with increasing loading levels of a filler, the flexural modulus of the resulting composite typically increases, but the impact strength decreases. By adding the reinforcing additives of this invention to a filled polymeric matrix, the flexural modulus and impact strength both increase. Non-limiting examples of fillers include mineral and organic fillers (e.g., talc, mica, clay, silica, alumina, carbon fiber, carbon black glass fiber) and conventional cellulosic materials (e.g., wood flour, wood fibers, sawdust, wood shavings, newsprint, paper, flax, hemp, wheat straw, rice hulls, kenaf, jute, sisal, peanut shells, soy hulls, or any cellulose containing material). The amount of filler in the melt processable composition may vary depending upon the polymeric matrix and the desired physical properties of the finished composition. Those skilled in the art of melt processing polymers are capable of selecting appropriate amounts and types of fillers to match a specific polymeric matrix.

The amount of the filler in the melt processable composition may vary depending upon the polymeric matrix and the desired physical properties of the finished composition. In view of the present disclosure, the selection of an appropriate amount and type of filler(s) can be made to match with a specific polymeric matrix in order to achieve desired physical properties of the finished material. Typically, the filler may be incorporated into the melt processable composition in amounts up to about 90% by weight. The filler is generally added to the melt processable composite composition at levels between 5 and 90%, between 15 and 80%, or between 25 and 70% by weight of the formulation. Additionally, the filler may be provided in various forms depending on the specific polymeric matrices and end use applications. Non-limiting examples of filler form include, powder and pellets.

Cellulosic materials may be utilized in melt processable compositions as fillers to impart specific physical characteristics or to reduce cost of the finished composition. Cellulosic materials generally include natural or wood based materials having various aspect ratios, chemical compositions, densities, and physical characteristics. Non-limiting examples of cellulosic materials include wood flour, wood fibers, sawdust, wood shavings, newsprint, paper, flax, hemp, rice hulls, kenaf, jute, sisal, peanut shells. Combinations of cellulosic materials and a modified polymer matrix may also be used in the melt processable composition. The amount of cellulosic filler in the composite material may be adjusted to address end use processing. For example, cellulosic filler amounts may be adjusted in the composite to prevent defects in thermoforming applications, such as tearing during molding.

In another aspect of the invention, the melt processable composition may contain other additives. Non-limiting examples of conventional additives include antioxidants, light stabilizers, fibers, blowing agents, foaming additives, antiblocking agents, heat stabilizers, impact modifiers, biocides, compatibilizers, flame retardants, plasticizers, tackifiers, colorants, processing aids, lubricants, coupling agents, and pigments. The additives may be incorporated into the melt processable composition in the form of powders, pellets, granules, or in any other extrudable form. The amount and type of conventional additives in the melt processable composition may vary depending upon the polymeric matrix and the desired physical properties of the finished composition. Those skilled in the art of melt processing are capable of selecting appropriate amounts and types of additives to match with a specific polymeric matrix in order to achieve desired physical properties of the finished material.

The melt processable composition of the invention can be prepared by any of a variety of ways. For example, the thermoplastic matrix, reinforcing additive and the filler can be combined together by any of the blending means usually employed in the plastics industry, such as with a compounding mill, a Banbury mixer, or a mixing. The polymeric matrix, filler and the reinforcing additive may be used in the form, for example, of a powder, a pellet, or a granular product. The mixing operation is most conveniently carried out at a temperature above the melting point or softening point of the polymeric matrix. The resulting melt-blended mixture can be either extruded directly into the form of the final product shape or pelletized or otherwise comminuted into a desired particulate size or size distribution and fed to an extruder, which typically will be a single-screw extruder, that melt-processes the blended mixture to form the final product shape. In one embodiment, the reinforcing additive is premade in a separate melt processing step using a twin screw extruder. The premade additive is subsequently melt processed with a polymeric matrix and filler. The resulting composite exhibits superior performance results when the reinforcing additive is premade using this protocol.

Melt-processing typically is performed at a temperature from 120° to 300° C., although optimum operating temperatures are selected depending upon the melting point, melt viscosity, and thermal stability of the composition. Different types of melt processing equipment, such as extruders, may be used to process the melt processable compositions of this invention. Extruders suitable for use with the present invention are described, for example, by Rauwendaal, C., "Polymer Extrusion," Hansen Publishers, p. 11-33, 2001.

The composites of this invention are suitable for manufacturing articles in the construction and automotive industries. For example, in the construction industry articles incorporating the composition of the present invention may include: decking, sheeting, structural elements, roofing tiles, and siding. The improved mechanical properties of the present invention enable thin and or hollow profiles, thereby reducing cost and weight for particular end use applications. Those of skill in the art of designing construction articles are capable of selecting specific profiles for desired end use applications. Applications in the automotive industry include: body and interior panels and decorative articles. In some embodiments, the end use article may be sufficiently strong enough to permit the application of the molded article without metal or alloy strengthening supports.

The resulting articles produced by melt processing the inventive composition exhibit superior mechanical characteristics in the field of composite structures. For example, a composite comprised of a polypropylene matrix, wood flour and a reinforcing additive exhibits substantial increases in flexural modulus and flexural strength and impact strength.

Examples

Materials used to generate the following examples include:

| Material | Description |
| --- | --- |
| Resin 1 | PP5262, 2 MFI polypropylene commercially available from Exxon Mobil (Houston, TX) |
| Resin 2 | Marlex EHM6007, 0.65 MFI high density polyethylene commercially supplied by Chevron Phillips Chemical (The Woodlands, TX) |
| Resin 3 | 1001.32, 1.0 MFI linear low density polyethylene, commercially available from Exxon Mobil (Houston, TX) |
| Filler 1 | Wood Fiber, 40 mesh hardwood fiber commercially available from American Wood Fibers (Schofield, WI) |
| Fiber 1 | Sisal 210, commercially available from International Fibers Corporation (North Tonawanda, New York) |
| CA 1 | Exxelor PO1020A, maleated polypropylene, commercially available from Exxon Mobil (Houston, TX) |
| CA 2 | Polybond 3029, maleated polyethylene, commercially supplied by Chemtura (Middlebury, CT) |
| CA 3 | Integrate NE507030, maleated polyethylene, commercially supplied by Equistar Chemicals (Cincinatti, OH) |
| Elastomer | Engage 8003, 1 MFI, polyethylene/octene copolymer, commercially available from Dow Chemical (Midland, MI) |

Reinforcing additive concentrates were prepared using the following protocol. Fiber(s), Elastomer and Coupling Agent(s) were dry mixed in a plastic bag and gravity fed into a 27 mm co-rotating twin screw extruder (36:1, L:D) fitted with three strand die (commercial available from American Leistritz Extruder Corporation, Sommerville, N.J.). All samples were processed at 200 rpm screw speed using the following temperature profile: Zone 1-2=130° C., Zone 3-4=150° C., Zone 5-6=170° C., Zone 7-8=170° C., Die=170° C. The resulting strands were subsequently cooled in a water bath and pelletized into 0.64 cm pellets.

Composite samples were prepared and testing using the following protocol. Reinforcing Additive, Resin and Filler were dry mixed in a plastic bag and gravity fed into a 27 mm co-rotating twin screw extruder (36:1, L:D) fitted with three strand die (commercial available from American Leistritz Extruder Corporation, Sommerville, N.J.). All samples were processed at 150 rpm screw speed using the following temperature profile: Zone 1-2=150° C., Zone 3-4=160° C., Zone 5-6=180° C., Zone 7-8=190° C. The resulting strands were subsequently cooled in a water bath and pelletized into 0.64 cm pellets. The resulting pellets were injection molded into test specimens following ASTM D638 (tensile) and D790 (flexural) specifications. Injection molding on composite formulations was performed using a 85 ton machine (commercially available from Engel Corporation, York, Pa.) having a barrel and nozzle temperature of 175° C. The flexural and impact properties were subsequently tested as specified in ASTM D790 and D256; respectively.

Table 1 gives the formulations for the reinforcing additives examples RA1-RA8 that were produced. Table 2 provides the formulations for C1-C12 and Examples 1-25 that were produced. Table 3 gives the mechanical properties for composite formulations C1-C12 and Examples 1-25.

TABLE 1

Formulations for Reinforcing Additive Examples RA1-RA8

| Example | CA 1 (wt %) | CA 2 (wt %) | CA 3 (wt %) | Elastomer (wt %) | Fiber 1 (wt %) |
|---|---|---|---|---|---|
| RA1 | 75 | — | — | — | 25 |
| RA2 | 50 | — | — | — | 50 |
| RA3 | 37.5 | — | — | 37.5 | 25 |
| RA4 | 50 | — | — | 25 | 25 |
| RA5 | — | 75 | — | — | 25 |
| RA6 | — | 50 | — | — | 50 |
| RA7 | — | 37.5 | — | 37.5 | 25 |
| RA8 | — | — | 75 | — | 25 |

TABLE 2

Formulations for Composite Formulations, Comparative Examples C1-C12 and Examples 1-25

| Example | Resin 1 (%) | Resin 2 (%) | Resin 3 (%) | Filler 1 (%) | Fiber 1 | Elastomer | Additive | Additive (%) |
|---|---|---|---|---|---|---|---|---|
| C1 | 50 | — | — | 50 | — | — | — | — |
| C2 | — | 50 | — | 50 | — | — | — | — |
| C3 | — | — | 50 | 50 | — | — | — | — |
| C4 | 48 | — | — | 50 | — | — | CA1 | 2 |
| C5 | — | 48 | — | 50 | — | — | CA2 | 2 |
| C6 | — | — | 48 | 50 | — | — | CA3 | 2 |
| C7 | 48 | — | — | 47.5 | 2.5 | — | CA1 | 2 |
| C8 | 42.5 | — | — | 47.5 | 2.5 | — | CA1 | 7.5 |
| C9 | 42.5 | — | — | 47.5 | 2.5 | 3.75 | CA1 | 3.75 |
| C10 | 100 | — | — | — | — | — | — | — |
| C11 | — | 100 | — | — | — | — | — | — |
| C12 | — | — | 100 | — | — | — | — | — |
| 1 | 37.5 | — | — | 47.5 | — | 5 | RA1 | 10 |
| 2 | 48.1 | — | — | 49.4 | — | — | RA1 | 2.5 |
| 3 | 42.5 | — | — | 47.5 | — | — | RA1 | 10 |
| 4 | 48.75 | — | — | 48.75 | — | — | RA2 | 2.5 |
| 5 | 45 | — | — | 45 | — | — | RA2 | 10 |
| 6 | 42.5 | — | — | 47.5 | — | — | RA3 | 10 |
| 7 | 42.5 | — | — | 47.5 | — | — | RA4 | 10 |
| 8 | — | 48.1 | — | 49.4 | — | — | RA5 | 2.5 |
| 9 | — | 42.5 | — | 47.5 | — | — | RA5 | 10 |
| 10 | — | 48.75 | — | 48.75 | — | — | RA6 | 2.5 |
| 11 | — | 45 | — | 45 | — | — | RA6 | 10 |
| 12 | — | 42.5 | — | 47.5 | — | — | RA7 | 10 |
| 13 | — | — | 42.5 | 47.5 | — | — | RA8 | 10 |
| 14 | 90 | — | — | — | — | — | RA1 | 10 |
| 15 | 80 | — | — | 10 | — | — | RA1 | 10 |
| 16 | 70 | — | — | 20 | — | — | RA1 | 10 |
| 17 | 60 | — | — | 30 | — | — | RA1 | 10 |
| 18 | 50 | — | — | 40 | — | — | RA1 | 10 |
| 19 | 40 | — | — | 50 | — | — | RA1 | 10 |
| 20 | — | 90 | — | — | — | — | RA5 | 10 |
| 21 | — | 80 | — | 10 | — | — | RA5 | 10 |
| 22 | — | 70 | — | 20 | — | — | RA5 | 10 |
| 23 | — | 60 | — | 30 | — | — | RA5 | 10 |
| 24 | — | 50 | — | 40 | — | — | RA5 | 10 |
| 25 | — | 40 | — | 50 | — | — | RA5 | 10 |

TABLE 3

Mechanical Properties of Comparative Examples C1-C12 and Examples 1-25

| Example | Flexural Modulus (MPa) | Flexural Strength (MPa) | Unnotched Impact Strength (J/m) | Notched Impact Strength (J/m) |
|---|---|---|---|---|
| C1 | 3550 | 49 | 138 | 58 |
| C2 | 3100 | 44 | 112 | 55 |
| C3 | 1160 | 24 | 315 | 138 |
| C4 | 3690 | 66 | 213 | 64 |
| C5 | 3310 | 58 | 232 | 69 |
| C6 | 1450 | 36 | 464 | 208 |
| C7 | 3470 | 48 | 127 | 61 |
| C8 | 3520 | 55 | 146 | 60 |
| C9 | 3150 | 44 | 155 | 61 |
| C10 | 1330 | 34 | 665 | 32 |
| C11 | 1650 | 30 | 1460 | 185 |
| C12 | 135 | 7.9 | N/A | N/A |
| 1 | 3460 | 80 | 310 | 84 |
| 2 | 4310 | 89 | 262 | 76 |
| 3 | 5100 | 93 | 280 | 85 |
| 4 | 3940 | 72 | 194 | 67 |
| 5 | 4290 | 82 | 227 | 75 |
| 6 | 5000 | 90 | 295 | 90 |
| 7 | 3780 | 88 | 308 | 92 |
| 8 | 4000 | 78 | 265 | 74 |
| 9 | 4140 | 71 | 258 | 86 |
| 10 | 4070 | 69 | 277 | 83 |
| 11 | 4320 | 67 | 249 | 81 |
| 12 | 4070 | 73 | 256 | 86 |

TABLE 3-continued

Mechanical Properties of Comparative
Examples C1-C12 and Examples 1-25

| Example | Flexural Modulus (MPa) | Flexural Strength (MPa) | Unnotched Impact Strength (J/m) | Notched Impact Strength (J/m) |
|---|---|---|---|---|
| 13 | 3980 | 76 | 266 | 79 |
| 14 | 1500 | 56 | 508 | 70 |
| 15 | 1860 | 62 | 340 | 68 |
| 16 | 2330 | 70 | 310 | 61 |
| 17 | 2830 | 74 | 287 | 68 |
| 18 | 3700 | 85 | 262 | 65 |
| 19 | 4430 | 93 | 246 | 63 |
| 20 | 1050 | 37 | 1305 | 162 |
| 21 | 1620 | 47 | 516 | 105 |
| 22 | 2320 | 58 | 367 | 96 |
| 23 | 2810 | 65 | 314 | 91 |
| 24 | 3620 | 71 | 299 | 84 |
| 25 | 4340 | 75 | 242 | 74 |

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A composite composition comprising:
   (a) a thermoplastic polymeric matrix,
   (b) 1-10 wt. % of a premade, melt processed reinforcing additive formed from a mixture comprising 25-75% by weight of a coupling agent, 15-60% by weight cellulosic fiber, and optionally 25-75% by weight of an elastomeric polymer, and
   (c) 15-65 wt. % of a cellulosic filler,
   wherein the coupling agent selectively improves the interfacial adhesion between the thermoplastic polymeric matrix and the cellulosic fibers.

2. The composite composition according to claim 1, wherein the cellulosic fiber has an a weight average aspect ratio of at least 10:1.

3. The composite composition according to claim 1, wherein the elastomeric polymer is a polyolefin based polymer or copolymer.

4. The composite composition according to claim 1, wherein the cellulosic fiber is wood flour, wood fibers, sawdust, wood shavings, newsprint, paper, flax, hemp, rice hulls, kenaf, jute, sisal, peanut shells or combinations thereof.

5. The composite composition according to claim 1, wherein the coupling agent is a functionalized polyolefin.

6. The composite composition according to claim 1, wherein the thermoplastic polymeric matrix is selected from polyamides, polyimides, polyurethanes, polyolefins, polystyrenes, polyesters, polycarbonates, polyketones, polyureas, polyvinyl resins, polyacrylates and polymethylacrylates.

7. The composite composition according to claim 1, wherein composite exhibits two or more of a flexural modulus of greater than 3500 MPa, a flexural strength of greater than 65 MPa, and an unnotched impact strength of greater than 186 joules/meter.

8. A method of forming a composite comprising melt processing (i) a thermoplastic polymeric matrix, (ii) a pre-made melt processed reinforcing additive formed from a mixture comprising 25-75% by weight of a coupling agent, 15-60% by weight cellulosic fiber, and optionally 25-75% by weight of an elastomeric polymer, and (iii) a cellulosic filler; wherein the coupling agent selectively improves the interfacial adhesion between the thermoplastic polymeric matrix and the cellulosic fibers; and
   the composite composition includes 1-10 wt. % of the melt processed reinforcing additive; and 15-65 wt. % of the cellulosic filler.

9. The method of claim 8, wherein the melt processing includes extrusion, injection molding, batch mixing, blow molding or rotomolding.

10. A method comprising: (a) forming a reinforcing additive by melt processing a mixture comprising 25-75% by weight of a coupling agent, 15-60% by weight cellulosic fiber, and optionally 25-75% by weight of an elastomeric polymer, and
    (b) melt processing the reinforcing additive and a cellulosic filler in a polymeric matrix to form a composite composition;
    wherein the coupling agent selectively improves the interfacial adhesion between the thermoplastic polymeric matrix and the cellulosic fibers;
    wherein the composite composition includes 1-10 wt. % of the melt processed reinforcing additive; and 15-65 wt. % of the cellulosic filler.

11. An article comprising the composite composition of claim 1.

12. The article of claim 11, wherein the article is a building material, an automotive component, or a thermoformable sheet.

13. A composite composition comprising a melt processable material derived from (i) a thermoplastic polymeric matrix, (ii) a pre-made melt processed reinforcing additive formed from a mixture comprising 25-75% by weight of a coupling agent, 15-60% by weight cellulosic fiber, and optionally 25-75% by weight of an elastomeric polymer, and (iii) a cellulosic filler;
    wherein the coupling agent selectively improves the interfacial adhesion between the thermoplastic polymeric matrix and the cellulosic fibers;
    and the composite composition includes 1-10 wt. % of the melt processed reinforcing additive; and 15-65 wt. % of the cellulosic filler.

14. A melt processable composite composition formed by a process comprising: melt processing a first mixture comprising (a) a thermoplastic matrix polymer, which comprises polyolefin and/or polyolefin copolymer; (b) 1-10 wt. % of a premade, melt processed reinforcing additive, and (c) 15-65 wt. % cellulosic filler;
    wherein the premade, melt processed reinforcing additive is formed by a separate initial step of melt processing a second mixture comprising 25-75% by weight coupling agent, 15-60% by weight cellulosic fiber, and optionally 25-75% by weight elastomeric polymer; and the coupling agent comprises functionalized polyolefin; and
    the cellulosic fiber is a material derived from cellulose having a weight average aspect ratio of at least 10:1; and the cellulosic filler is a material derived from cellulose having a weight average aspect ratio of less than 5:1.

15. The composite composition of claim 14, wherein the thermoplastic matrix polymer comprises polyolefin; the functionalized polyolefin comprises maleated polyolefin.

16. The composite composition of claim 14, wherein the thermoplastic matrix polymer comprises polypropylene and/or polyethylene; and the coupling agent comprises maleated polypropylene and/or maleated polyethylene.

17. The composite composition of claim 14, wherein the cellulosic filler comprises wood flour; and the cellulosic fiber comprises sisal.

18. The composite composition of claim 14, wherein melt processing the second mixture comprises extruding and/or batch mixing the second mixture.

19. An article comprising the composite composition of claim 14, wherein the article is a building material, an automotive component, or a thermoformable sheet.

20. The article of claim 19, wherein the article is a thermoformed, compression molded or compression-blow molded automotive component.

21. A melt processable composite composition comprising (a) a thermoplastic polymeric matrix, (b) a pre-made, melt-processed reinforcing additive formed from 25-75 wt. % of a coupling agent, 15-60 wt. % cellulosic fiber, and optionally an elastomeric polymer, and (c) cellulosic filler;

wherein coupling agent comprises functionalized polyolefin; and the composite composition includes 1-10 wt. % of the premade, melt-processed reinforcing additive; and 15-65 wt. % of the cellulosic filler;

the cellulosic fiber is a material derived from cellulose having a weight average aspect ratio of at least 5:1; and the cellulosic filler is a material derived from cellulose having a weight average aspect ratio of less than 5:1.

22. The composite composition of claim 21, wherein the premade, melt-processed reinforcing additive comprises the elastomeric polymer.

23. The composite composition of claim 21, wherein the cellulosic fiber has a weight average aspect ratio of at least 10:1; thermoplastic matrix polymer comprises polyolefin; and the functionalized polyolefin comprises maleated polyolefin.

24. The composite composition of claim 23, wherein the cellulosic filler comprises wood flour; and the cellulosic fiber comprises sisal.

* * * * *